Patented Feb. 24, 1925.

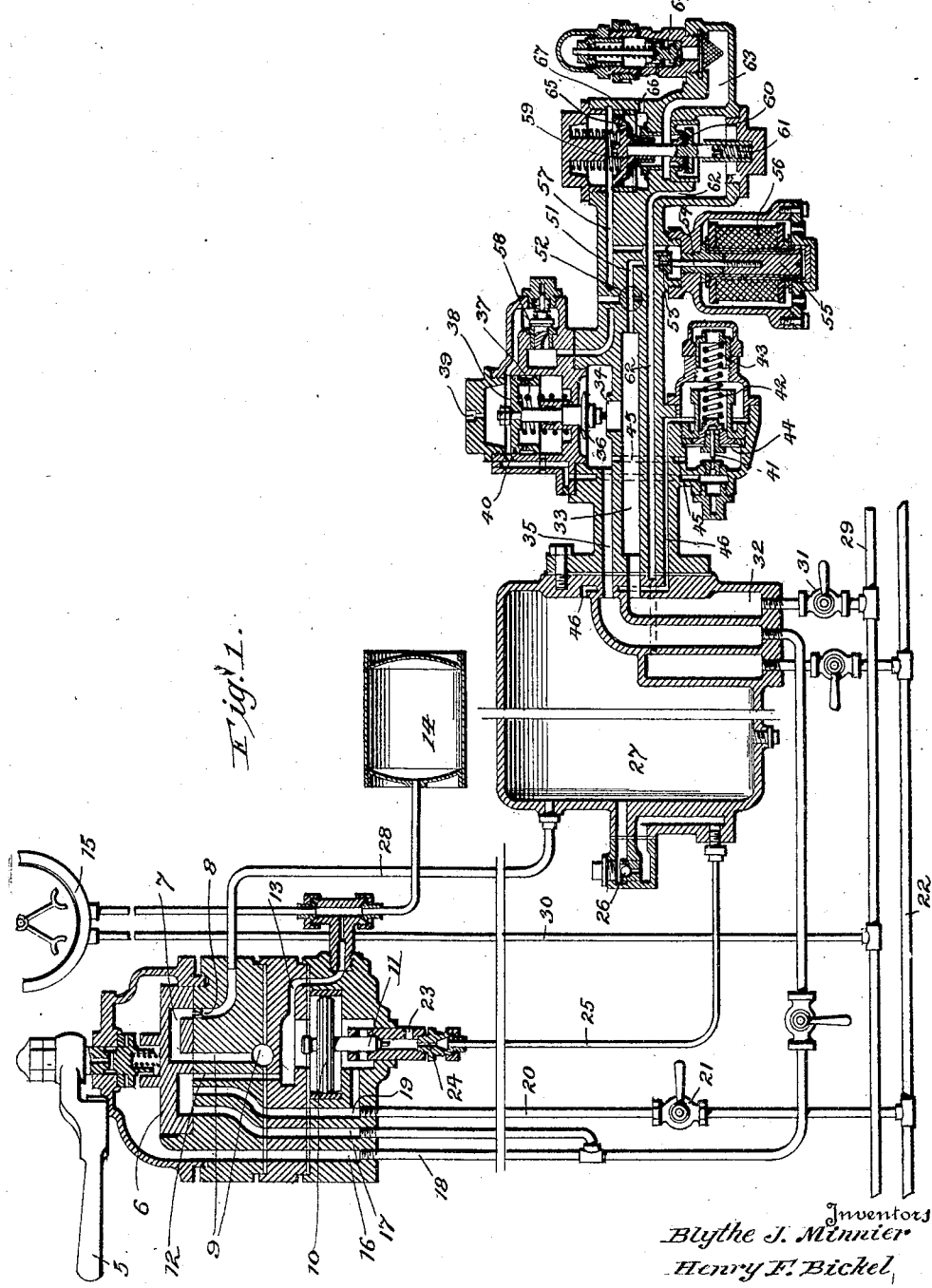

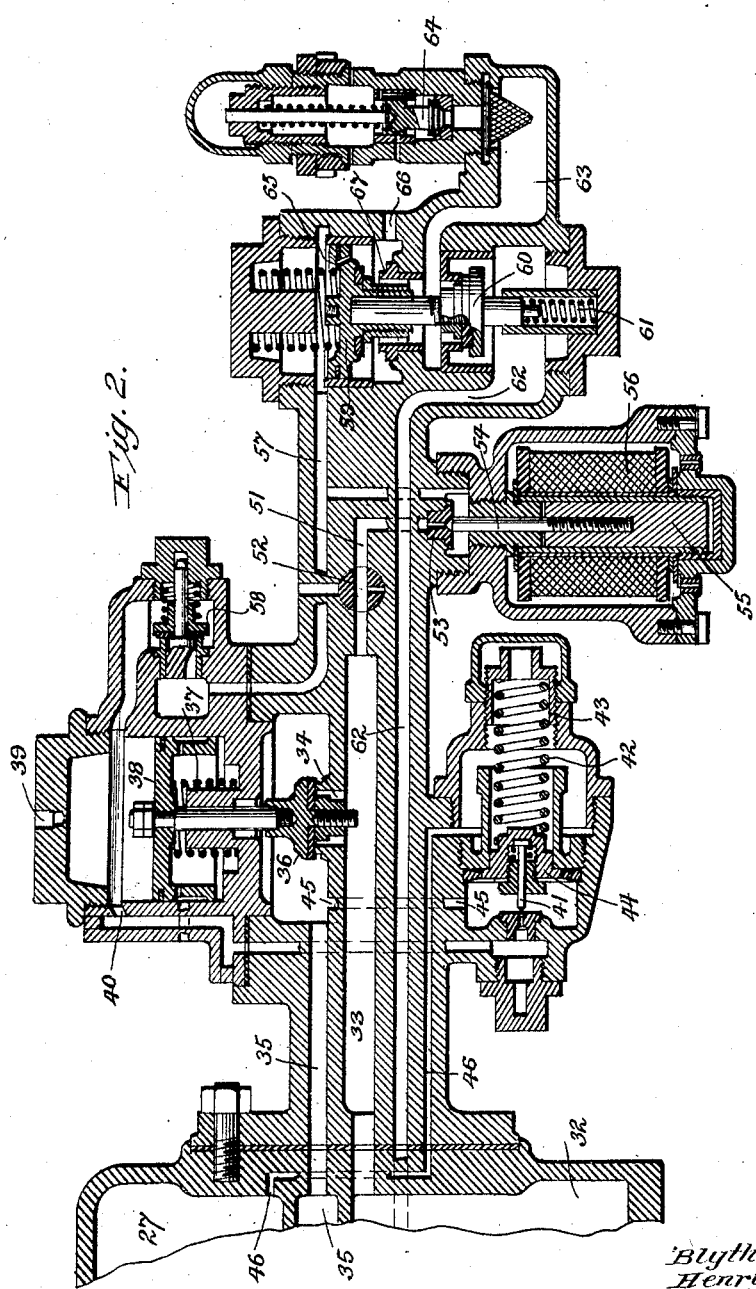

1,527,264

UNITED STATES PATENT OFFICE.

BLYTHE J. MINNIER, OF WATERTOWN, NEW YORK, AND HENRY F. BICKEL, OF PLAINFIELD, NEW JERSEY.

AIR BRAKE.

Application filed April 25, 1924. Serial No. 708,922.

*To all whom it may concern:*

Be it known that we, BLYTHE J. MINNIER and HENRY F. BICKEL, citizens of the United States, residing at Watertown, Jefferson Co., and State of New York, and Plainfield, county of Union and State of New Jersey, respectively, have invented certain new and useful Improvements in Air Brakes, of which the following is a specification.

This invention relates to air brakes and particularly to the control of automatic air brakes by signalling or controlling mechanism on the track. Generally stated, the broad inventive concept resides in the mechanism for producing a brake application by venting the brake pipe, and simultaneously closing communication from the main reservoir to the brake pipe.

Stated somewhat more specifically, the invention contemplates the application of an automatic control device to an air brake system having a variable pressure feed valve, in such a way that the automatic stop device, when it functions, so affects the variable pressure feed valve as to close this valve regardless of the pressure in the brake pipe. This imparts to the feed valve an additional function: it becomes a combined feed and stop valve. The result is that the mechanism as a whole is greatly simplified.

In its preferred embodiment, the invention involves the control, by an automatic train stop mechanism, of the variable pressure feed valve, forming a part of the air brake systems described and claimed in the applications of Bickel & Minnier, Serial Nos. 573,326 and 597,967, respectively filed July 7, 1922, and Oct. 30, 1922, the train stop mechanism serving, when it operates, to close the feed valve positively.

The general inventive concept claimed in the applications specifically referred to, and hence not claimed herein except in combination with the added features, is the control of the releasing function of the air brakes by a limitation of the duration of the full release function of the engineer's valve. This limitation is imposed in accordance with the quantity of air previously released from the brake pipe to produce the application undergoing release.

The quantity of air released from the brake pipe to produce an application is a function of the length of the train (brake pipe volume) and the intensity of the application (brake pipe pressure reduction). The general mode of operation described and claimed in the applications aforesaid is to impound the air released from the engineer's brake valve, or a proportional part thereof, under pressure, and to cause this pressure, according to its intensity, to counteract the pressure reducing function of the feed valve. In full release, running, and holding positions, the impounded air is gradually vented through a port in the engineer's valve so that as the impounded pressure bleeds away, the pressure reducing function of the feed valve is gradually restored.

By properly proportioning the parts, overcharge of the reservoirs near the front of the train is minimized or prevented. Furthermore, since the restoration of the pressure reducing function of the feed valve is gradual, there are no pressure surges or waves in the brake pipe, and consequently there is less tendency for reapplication to occur, since the feed grooves of the triple valves are adequate to permit gradual pressure equalization even where a reservoir has been slightly overcharged.

Since the feed valve used in this mechanism is designed for a secondary fluid pressure control, it is peculiarly adapted to be actuated by fluid pressure means under the control of the automatic train stop mechanism. Such control is one of the specific purposes of the present invention.

A successful embodiment of the invention is illustrated in the accompanying drawings, in which:

Fig. 1 is a diagrammatic section showing the engineer's brake valve in release position, and the feed valve mechanisms in the positions which they assume at the commencement of the release;

Fig. 2 is a view on an enlarged scale, showing the feed valve parts in the positions which they assume when the brake pipe is fully charged.

The engineer's brake valve is of the familiar equalizing discharge type and preferably has six positions customarily known as release; running; holding; lap; service; and emergency.

In standard air brake systems, as at present constructed, release position feeds main reservoir air to the brake pipe without pressure reduction, and running position feeds main reservoir air to the brake pipe with pressure reduction. These two positions also are commonly used to effect differences in the rate of release of the engine and tender brakes. In the structure of the present invention, the last-named feature, generally stated, is retained, but there is no difference in the rate of feed of air to the brake pipe under the control of the engineer's brake valve, as the rate of feed is automatically controlled by the feed valve as will hereinafter be more fully explained.

This detail is fully brought out in the applications above identified, and need not be discussed fully here except to the extent of negativing any implication as to its necessary presence or absence.

The engineer's brake valve includes the usual handle 5, connected to rotate the usual rotary valve 6. So far as is pertinent to the present invention, the rotary valve 6 does not differ from those of standard form, except that it has a port 7 which, in release, running, and holding positions, connects a minute port 8 in the valve seat with the usual exhaust port 9.

The engineer's brake valve includes the usual equalizing discharge piston 10, operating an equalizing discharge valve 11. The space above the piston 10 is connected with a port 12, in the valve seat, and with a port 13, leading to the equalizing discharge reservoir 14, and duplex pressure gauge 15. The main air port 16 leading to the space above the rotary valve 6, and feed port 17 leading to the seat of the valve 6, are both connected through branches with a feed pipe 18, which conducts air to the engineer's brake valve from the variable pressure feed valve hereinafter described.

The brake pipe port 19 is connected by a pipe 20, having the usual stop cut-out cock 21, with the brake pipe 22.

The above connection will be familiar to those skilled in the art, except in the use of the special ports 7 and 8, and the connection of the feed pipe 18 to the main air port 16, as well as to the feed port 17 to the valve.

The equalizing discharge valve 11 is provided with a special fitting having a somewhat restricted lateral discharge port 23 leading to the atmosphere, and a second usually more restricted port 24 leading by way of pipe 25, past check valve 26 to a reservoir 27, known as the brake pipe discharge reservoir. This reservoir is connected by a pipe 28, with the restricted port 8 in the rotary valve seat.

When the brakes are applied, air is vented in the usual manner by the equalizing discharge valve 11, and since the port 24 is connected to the space between the valve 11 and the restricted port 23, a proportional part of the discharging air flows through pipe 25 past check valve 26 into reservoir 27. In all positions, except release, running, and holding, port 8 is closed by the rotary valve, consequently the quantity of air impounded in the brake pipe discharge reservoir 27 is proportional, or approximately so, to the quantity of air released by valve 11. The duration of flow of this air in release, running, and holding positions through restricted port 8 will be approximately proportional to the quantity of air in the reservoir 27. The persistence of pressure in the reservoir 27 is used to suspend the function of the feed valve by means which will now be described.

The main air pipe 29 leads from the main reservoir, not shown. It is connected by the pipe 30, with the duplex pressure gauge 15, in the usual manner, and is also connected through a stop valve 31, with a port 32 formed in the shell of brake pipe discharge reservoir 27. Port 32 leads to a port 33 in a connected casting, and communicates through valve seat 34 with a port 35, which, in turn, is connected to the feed pipe 18 already described.

The valve seat 34 is the seat of the variable pressure feed valve 36. This valve is urged in an opening direction by a coil spring 37, and under certain conditions is forced closed by pressure acting on the upper side of a piston 38. The space above the piston 38 is vented to atmosphere by a minute port 39, and may be fed with pressure fluid through a supply port 40, of larger capacity, under the control of a so-called pin valve 41. This pin valve is urged to its seat by a spring 42, whose tension is adjustable in the usual manner by a threaded spring seat 43.

The valve is connected with a flexible diaphragm 44, of usual construction, which is subject on its lower face to pressure in the port 35 conducted thereto by a branch port 45. In other words, the pressure in the feed pipe 18 and connected port 35 is transmitted through the port 45 and acts on the diaphragm 44 in opposition to the spring 42.

When the pressure in the feed pipe is sufficient to overpower the spring 42, it opens the pin valve 41 and air flows through passage 45, passes by way of the port 40 to the place above the piston 38. Since the rate of feed through the port 40 is faster than the outflow of the port 39, the effect is to close the valve 36.

The apparatus so far described will be recognized as a familiar type of pressure regulating feed valve. Its action is modified, however, by the pressure existing in the brake pipe discharge reservoir 27, which is conducted by way of a port 46 so as to act on the diaphragm 44 in opposition to the feed pipe pressure. Consequently, whenever pressure exists in the brake pipe discharge reservoir 27, the pressure reducing function of the feed valve mechanism is partially or wholly suspended, according to the degree of pressure in the reservoir 27.

The train control mechanism is combined with the feed mechanism just described in such a way that when the control mechanism functions it vents the brake pipe to atmosphere and positively closes the valve 36 by admitting main reservoir air against the upper side of piston 38.

The construction is as follows: Leading from the port 33 is a port 51. This is controlled by a three-way valve 52, which may be set manually to cut off the automatic control mechanism and open a bleed or warning port of small size, as will be apparent from inspection of the drawing. This is merely to cut the apparatus out of action if defective, and give notice of such condition to inspectors.

The port 52 leads to the seat 53 of a pin valve 54. The pin valve 54 is held closed by an armature 55 and winding 56. The excitation of the winding 56 is under the control of the train stop mechanism and in normal or safe condition the winding is excited and the valve 54 is held tightly against its seat 53. If the winding 56 be deenergized by the train stop mechanism or by any failure of the apparatus the valve 54 opens and allows main reservoir air arriving by way of ports 33 and 51 to flow by way of port 57, past spring-held check valve 58, to the space above the piston 38. This immediately closes the valve 36 against its seat 34, and prevents any feed of main reservoir air to the brake pipe. At the same time main reservoir air flows by port 57 to the space above a piston 59. When the piston 59 by its resulting downward movement forces open a valve 60, which is normally held closed by a spring 61, and also by brake pipe pressure arriving by way of the port 62, the opening of the valve 60 allows brake pipe air to escape by way of passage 63 to a safety valve 64, through which it discharges to atmosphere.

Pressure in the chamber above the piston 38 is allowed to gradually bleed to the atmosphere through the relief port 39 and likewise from the chamber above the piston 59 through a relief port 65 formed in said piston, and a port 66, as best indicated in Fig. 2, such action continuing until such time as the tension of the springs 37 and 61 respectively force the pistons upwardly to their normal positions.

When the under face of piston 59 is moved away from its seat 67, the pressure remaining in the passage or chamber 63 below the safety valve 64 is allowed to bleed to atmosphere through the port 66. This prevents any undesirable popping of the safety valve 64 if any leak should occur between the valve 60 and its seat.

The safety valve 64 might be omitted, but it is customarily used in systems of this character to prevent the reduction of brake pipe pressure below a desired value. The purpose of so limiting the reduction of brake pipe pressure is to limit the severity of the resulting brake application.

The operation of the mechanism has been set forth in connection with the description of the parts and therefore need not be repeated.

It is important to observe that the main feed valve 36 functions in three different ways. At the commencement of release, it opens wide and remains so until the pressure in the reservoir 27 falls to a point determined by the adjustment of the apparatus. From then on the valve 36 operates to produce a pressure reduction, the degree of pressure reduction gradually increasing as the pressure in the reservoir 27 falls. When the pressure in the reservoir 27 is atmospheric, the valve 36 functions to maintain standard brake pipe pressure.

Finally, whenever the safety stop mechanism functions to produce an application of the brakes, the valve 36 operates as a stop valve and prevents air from feeding to the brake pipe from the main reservoir. Under these conditions it performs two valuable functions. It conserves the main reservoir air which may soon be urgently needed to release the brakes, and it prevents interference with the application of the brakes by air fed to the brake pipe from the main reservoir.

What is claimed is:

1. The combination with an automatic air brake system including a brake pipe, and a pressure regulating feed valve arranged to feed air thereto, of a train control device arranged to vent said brake pipe to apply the brakes; and means simultaneously operable by said train control device serving to close said feed valve.

2. The combination with an automatic air brake system including a brake pipe, an engineer's valve having release, running, and holding positions, and a pressure regulating feed valve arranged to feed air to the brake pipe in both release, running, and holding positions of the engineer's brake valve; of a train control device arranged to vent said brake pipe to apply the brakes; and means simultaneously operable by said train control device serving to close said feed valve.

3. The combination with an automatic air brake system including a main reservoir, a brake pipe, an engineer's brake valve having release, running, and holding positions, and a pressure regulating valve normally subject to brake pipe pressure and serving to control the feed of main reservoir air to the brake pipe in release, running, and holding positions of the engineer's brake valve; of a train control device arranged to vent said brake pipe to apply the brakes; and means simultaneously operable by said control device and serving to subject said pressure regulating valve to main reservoir pressure to close the feed valve.

4. The combination with an automatic air brake system including a main reservoir, a brake pipe, an engineer's brake valve having release, running, and holding positions, and a pressure regulating feed valve normally subject to brake pipe pressure and serving to control the feed of main reservoir air to the brake pipe in release, running, and holding positions of the engineer's brake valve; of a normally closed brake pipe vent valve; an abutment serving when subjected to pressure to open said vent valve; and an automatically controlled valve mechanism arranged to admit pressure fluid against said abutment to open said vent valve and to admit pressure fluid to the regulating mechanism of the feed valve to close the latter.

5. In an automatic air brake system, the combination of an engineer's brake valve including a discharge valve for discharging air from the brake pipe to effect an application of the brakes, and having a restricted discharge port beyond said valve; a reservoir connected between said discharge valve and said discharge port, whereby a portion of the air discharged by said valve is confined in said reservoir; means controlled by said engineer's brake valve in its brake releasing position for gradually venting air from said reservoir; a feed valve controlling the feed of air to the brake pipe; a feed valve actuating piston connected to move said feed valve in a closing direction when said piston is under pressure; a regulating valve structure including a spring and an abutment, the regulating valve being arranged to be urged closed by the spring and by pressure in said reservoir acting on said abutment, and urged open by pressure in said brake pipe acting on said abutment, said regulating valve when open serving to admit pressure fluid to act on said feed-valve actuating piston; an automatic train control device serving, when actuated, to vent the brake pipe; and means controlled by said train control device for simultaneously admitting pressure fluid against said feed-valve actuating piston.

6. In an automatic air brake system, the combination of an engineer's brake valve including a discharge valve for discharging air from the brake pipe to effect an application of the brakes, and having a restricted discharge port beyond said valve; a reservoir connected between said discharge valve and said discharge port, whereby a portion of the air discharged by said valve is confined in said reservoir; means controlled by said engineer's brake valve in its brake releasing positions for gradually venting air from said reservoir; a feed-valve controlling the feed of air to the brake pipe; a feed-valve actuating piston connected to move said feed-valve in a closing direction when said piston is under pressure; a regulating valve structure including a spring and an abutment, the regulating valve being arranged to be urged closed by the spring and by pressure in said reservoir acting on said abutment, and urged open by pressure in said brake pipe acting on said abutment, said regulating valve when open serving to admit pressure fluid to act on said feed valve actuating piston; a pressure actuated brake pipe vent device; and an automatic train controlling device serving when actuated to admit pressure fluid simultaneously to said brake pipe vent device and to the actuating piston of said feed valve.

In testimony whereof we have signed our names to this specification.

BLYTHE J. MINNIER.
HENRY F. BICKEL.